US006865314B1

(12) United States Patent
Blair et al.

(10) Patent No.: US 6,865,314 B1
(45) Date of Patent: Mar. 8, 2005

(54) TUNABLE OPTICAL WAVELENGTH FILTERS AND MULTI-LEVEL OPTICAL INTEGRATED CIRCUITS

(76) Inventors: Steven M. Blair, 3434 E. 7590 South, Salt Lake City, UT (US) 84121; Larry L. Campbell, 1599 Devonshire Dr., Salt Lake City, UT (US) 84121

(*) Notice: Subject to any disclaimer, the term of this patent is extended or adjusted under 35 U.S.C. 154(b) by 270 days.

(21) Appl. No.: 10/079,793

(22) Filed: Feb. 19, 2002

Related U.S. Application Data

(63) Continuation-in-part of application No. 10/044,808, filed on Jan. 11, 2002, now abandoned.
(60) Provisional application No. 60/311,719, filed on Aug. 10, 2001, provisional application No. 60/269,292, filed on Feb. 16, 2001, and provisional application No. 60/261,470, filed on Jan. 11, 2001.

(51) Int. Cl.[7] .................................................. G02B 6/26
(52) U.S. Cl. ................................................ 385/27; 385/15
(58) Field of Search ............................... 385/1, 15, 24, 385/27, 39, 50

(56) References Cited

U.S. PATENT DOCUMENTS

| 3,558,213 | A | 1/1971 | Marcatili |
|---|---|---|---|
| 3,589,794 | A | 6/1971 | Marcatili |
| 3,963,998 | A | 6/1976 | Richter |
| 4,026,632 | A | 5/1977 | Hill et al. |
| 4,097,826 | A | 6/1978 | Knox et al. |

(List continued on next page.)

OTHER PUBLICATIONS

Guillon B. et al., Si Micromachining and Whispering Gallery Dielectric Resonator Modes. An Original Issue for High Q Coplanar Millimeter Wave Cavity, SPIE, Jul. 1998, pp. 266–276, vol. 3465.

*Primary Examiner*—John D. Lee
*Assistant Examiner*—Jennifer Doan
(74) *Attorney, Agent, or Firm*—Gardner Groff, P.C.; R. Steven Coursey, Esq.

(57) ABSTRACT

The present invention comprises tunable optical wavelength filters and multi-level optical integrated circuits which use resonant optical cavities in a vertical arrangement with input and output waveguides. The resonant optical cavities are vertically separated from the input and output waveguides by a material or region of lower refeactive index. The vertical arrangement allows accurate control over the gap size between the waveguides and the cavities during manufacture. The present invention also enables the use of electrodes for enhancing tuning characteristics and for multiple tunable optical wavelength filters to be created in vertical alignment with one another by placing two resonant optical cavities and their respective input and output waveguides in vertical alignment with a low refractive index buffer between the multiple tunable optical wavelength filters. In addition, the present invention includes multiple manufacturing methods in which tunable optical wavelength filters are created on different substrates.

16 Claims, 9 Drawing Sheets

U.S. PATENT DOCUMENTS

| | | | |
|---|---|---|---|
| 4,282,499 A | | 8/1981 | DeFonzo |
| 4,630,885 A | | 12/1986 | Haavisto |
| 4,676,583 A | * | 6/1987 | Hicks, Jr. .................... 385/31 |
| 4,695,121 A | | 9/1987 | Mahapatra et al. |
| 4,720,160 A | * | 1/1988 | Hicks, Jr. .................... 385/31 |
| 4,775,214 A | * | 10/1988 | Johnson ...................... 385/12 |
| 4,799,749 A | | 1/1989 | Börner et al. |
| 4,992,763 A | | 2/1991 | Bert et al. |
| 5,158,908 A | | 10/1992 | Blonder et al. |
| 5,434,943 A | * | 7/1995 | Dentai et al. ............... 385/129 |
| 5,446,579 A | | 8/1995 | Lomashevitch |
| 5,457,760 A | | 10/1995 | Mizrahi |
| 5,506,712 A | | 4/1996 | Sasayama et al. |
| 5,526,153 A | | 6/1996 | Glance |
| 5,682,401 A | | 10/1997 | Joannopoulos et al. |
| 5,721,796 A | | 2/1998 | de Barros et al. |
| 5,742,633 A | | 4/1998 | Stone et al. |
| 5,784,400 A | | 7/1998 | Joannopoulos et al. |
| 5,790,583 A | | 8/1998 | Ho |
| 5,825,799 A | | 10/1998 | Ho et al. |
| 5,878,070 A | | 3/1999 | Ho et al. |
| 5,926,496 A | | 7/1999 | Ho et al. |
| 6,009,115 A | | 12/1999 | Ho |
| 6,052,495 A | | 4/2000 | Little et al. |
| 6,091,870 A | | 7/2000 | Eldada |
| 6,101,300 A | | 8/2000 | Fan et al. |
| 6,130,969 A | | 10/2000 | Villeneuve et al. |
| 6,154,591 A | | 11/2000 | Kershaw |
| 6,512,866 B1 | | 1/2003 | Fan et al. |
| 6,583,399 B1 | * | 6/2003 | Hunziker et al. ....... 250/214 R |

* cited by examiner

TUNABLE OPTICAL WAVELENGTH FILTERS AND MULTI-LEVEL OPTICAL INTEGRATED CIRCUITS

CROSS-REFERENCE TO RELATED APPLICATION

This patent application is a continuation-in-part of, claims priority on and the benefit of the filing dates of U.S. patent application Ser. No. 10/044,808 filed on Jan. 11, 2000 now abandoned; U.S. provisional application 60/261,470 filed on Jan. 11, 2001; U.S. provisional application 60/269,292 filed on Feb. 16, 2001; and U.S. provisional application 60/311,719 filed on Aug. 10, 2001.

FIELD OF THE INVENTION

The present invention relates, generally, to the field of apparatus and methods for use in optical telecommunication networks and, in its preferred embodiments, to the field of apparatus and methods for using and manufacturing devices having resonant optical cavities which tunably filter and otherwise manipulate wavelengths of light typically communicated by optical fiber telecommunication networks.

BACKGROUND OF THE INVENTION

Many of today's companies depend upon telecommunication networks to carry out their daily business. Because such networks often carry a great deal of information, they must optimally be fast, reliable and have a very high bandwidth.

As telecommunication networks are required to be more extensive and faster, the use of optical networking and/or optical components is becoming more and more important. Optical networks have the potential to provide much greater bandwidth than traditional networks. As optical networks are optimized, critical attention is paid to every component of such networks, including, but not limited to, optical routing circuits for routing network signals. Optical routing circuits may include tunable optical wavelength filters.

Tunable optical wavelength filters, typically, comprise a resonant cavity. Resonant cavities are well known in the fields of electromagnetics and optics. One type of resonant cavity that has been studied extensively is that which supports whispering gallery modes. This type of resonant cavity has been employed, as displayed in the prior art apparatus of FIG. 1, in integrated optics in the form of a cylindrical disk or ring cavity placed adjacent to coupling waveguides which are separated by a small spacing or gap. In use, a first (i.e., input) waveguide of the apparatus serves as the source of optical radiation. Only particular frequencies, or longitudinal modes, couple from the input waveguide to the cavity and then couple from the cavity to a second (i.e., output) waveguide. Thus, specific frequencies may be dropped from an optical input channel onto an optical output channel with high efficiency, a feature which makes this type of device useful for DWDM telecommunication applications such as add/drop filters, multiplexers, demultiplexers, and routers. In addition, these devices exhibit general resonance characteristics, which may be employed to advantage in dispersion compensation, electrically controlled switching, and enhancement of nonlinear optical effects. The usefulness of these devices increases when the resonance frequencies may be dynamically changed, allowing tunable wavelength filtering, tunable dispersion compensation, and other applications, and when large numbers of devices may be employed in the imple mentation of complex integrated optical circuits. Because of the long effective path length that is folded within the small cavity, these devices may also serve as modulators with very low drive voltage swing, and therefore, very low power consumption, and as nonlinear optical devices. Therefore, these devices can be considered a universal component of optical integrated circuits.

The prior art devices have, however, a few disadvantages and/or shortcomings. First, many of the prior art devices utilize side coupling, with the cavity and waveguides lying in the same plane. The manufacture of such a side coupled device requires very precise and high resolution lithography to be performed in order to control the gap spacing, which strongly affects the coupling between the cavity and waveguides, and therefore affects the quality factor, Q, of the cavity as well. Second, because the cavity and waveguides of such prior art devices are in the same plane, they are typically manufactured from the same material and have the same thickness. As a consequence, it is difficult to maximize performance of such prior art devices by phase matching the waveguides and cavity. Third, electrode placement in the planar prior art devices may be limited due to the side coupling arrangement of the waveguides and cavity and, hence, may interfere with the modes of the waveguides and, thereby introduce a potential source of loss. Fourth, the resonant cavities have only been considered as lying in the same plane, thereby limiting circuit flexibility and the density at which optical integrated circuits may be made. Finally, it is difficult to match the modal profile of the coupling waveguides to the desired mode of the cavity when using side coupling.

Therefore, there exists in the industry, a need for tunable resonant optical wavelength filters and other resonant devices for optical fiber telecommunication networks that may be manufactured in integrated optical circuits, and which address these and other related, and unrelated, problems.

SUMMARY OF THE INVENTION

Briefly described, the present invention comprises apparatuses and methods which utilize a resonant optical cavity to tunably filter wavelengths of light communicated in an optical fiber telecommunication network. According to the present invention, a highly efficient, tunable resonant optical wavelength filter, having a resonant optical cavity, is manufacturable in an optical chip form. The tunable resonant optical wavelength filter may serve as a basic element in more complex optical circuits (i.e., including, but not limited to, wavelength multiplexers, demultiplexers, add/drop circuits, routers, switches, dispersion compensators, and wavelength converters) necessary for the implementation of second generation DWDM optical networks.

The tunable resonant optical wavelength filter of the present invention has a number of advantages over prior art devices. In particular, the resonant cavity (which may be in a disk, ring, racetrack, or similar geometries) lies, preferably, on top of or beneath the input and output waveguides, vertically separated by a material or region of lower refractive index. The vertical arrangement allows more accurate control over the gap size during manufacture than does the traditional side coupling arrangement of the prior art, which requires the performance of very precise and high resolution lithography during manufacture in order to control the gap spacing, which strongly affects the coupling between the cavity and waveguides, and therefore affects the quality factor, Q, of the cavity as well. In the vertical arrangement of the present invention, the gap separation is controlled by a thin film deposition, implantation, or diffusion process, which can be more accurately controlled so that coupling efficiency and Q can be controlled. Also, since the waveguides and cavity are separated vertically, they may be made of different materials and may be of different thicknesses, either of which allows additional flexibility in maximizing device performance in terms of phase matching the waveguide and cavity modes for efficient coupling.

Additionally, there may be a lateral offset between the cavity and the input and output waveguides. The lateral offset allows improved overlap between the mode of the waveguides and the desired mode of the cavity. Accordingly, the cavity may either overhang or underhang the waveguides. When the cavity overhangs the waveguides, higher-order radial modes of the cavity may be excited. These higher-order modes are less susceptible to scattering losses. When the cavity underhangs the waveguides, a more efficient coupling into the fundamental cavity mode may be obtained from the waveguide. Both overhanging and underhanging arrangements of the cavity and the waveguides may be used to control the resonance bandwidth of the cavity.

In addition, the vertical geometry of the present invention makes the implementation of tuning mechanisms easier by enabling the avoidance of interference with the coupling waveguides. Finally, the vertical structure may be extended to include multi-layer optical circuits using a planarization technique.

Accordingly, it is an object of the present invention to provide a highly efficient, tunable resonant optical wavelength filter.

Another object of the present invention is to reduce the horizontal surface area of a tunable resonant optical wavelength filter.

Sill another object of the present invention is to allow accurate control over the gap size of a tunable resonant optical wavelength filter during manufacture.

Still another object of the present invention is to improve the quality factor and coupling efficiency of a tunable resonant optical wavelength filter.

Still another object of the present invention is to enable the manufacture of multi-layer optical circuits using a planarization technique.

Other objects, features, and advantages of the present invention will become apparent upon reading and understanding the present specification when taken in conjunction with the appended drawings.

DETAILED DESCRIPTION OF THE PREFERRED EMBODIMENTS

Figure 1A:
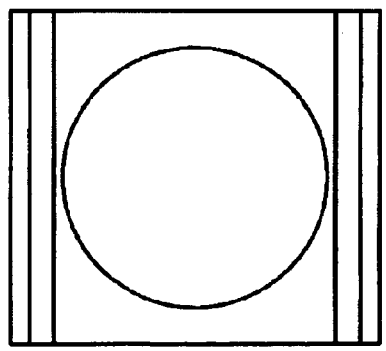
FIG. 1A is a top plan view of a prior art resonant cavity device having side-coupled geometry.
Figure 1B:
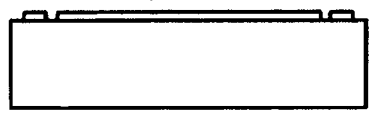
FIG. 1B is a front elevational view of the prior art resonant cavity device of FIG. 1A.
Figure 2A:
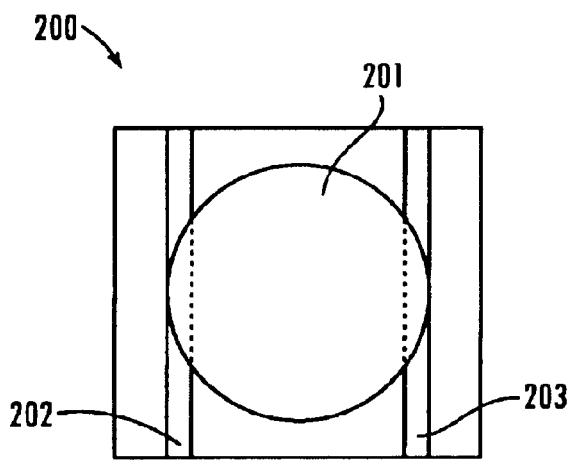
FIG. 2A is a top plan view of a resonant cavity device having a vertically-coupled resonant cavity, in accordance with the preferred embodiment of the present invention.
Figure 2B:
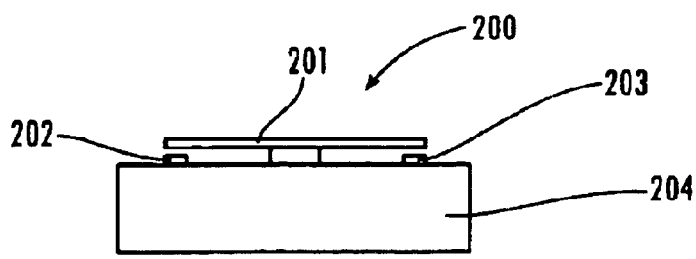
FIG. 2B is a front elevational view of the resonant cavity device of FIG. 2A.
Figure 2C:
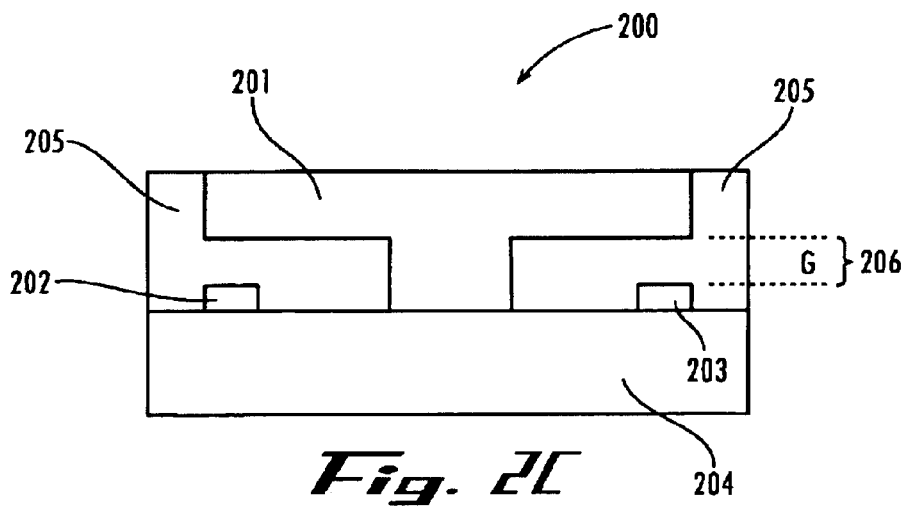
FIG. 2C is a front elevational view of a resonant cavity device having a vertically-coupled resonant cavity, in accordance with an alternate embodiment of the present invention, which is substantially similar to the resonant cavity device of FIGS. 2A and 2B.

Referring now to the drawings, in which like numerals represent like components or steps throughout the several views, a tunable resonant optical wavelength filter 200 in accordance with the preferred embodiment of the present invention, is displayed in FIGS. 2A and 2B. FIG. 2C illustrates a front elevational view of a resonant cavity device of an alternative embodiment of the present invention that is substantially similar to that of the preferred embodiment. The tunable resonant optical wavelength filter 200 comprises a resonant cavity 201 (which may be in a disk, ring, racetrack, polygonal, or similar geometries) that lies vertically aligned with an input and an output waveguide 202, 203 separated by a gap 206 having a gap length, "G". The waveguides 202, 203 and the cavity 201 are vertically separated by a buffer material 205 of lower refractive index. The buffer material 205 must have a lower refractive index than either the resonant cavity 201 or the waveguides 202, 203. The buffer material 205 fills the gap 206 between the waveguides 202, 203 and the cavity 201. The length of the cavity 201 determines the resonance wavelengths; which are the wavelengths that pass from the input waveguide 202 to the output waveguide 203 with high efficiency. These wavelengths, or frequencies, are periodic, with the period being given by the cavity free spectral range, which is approximately $$FSR = c/nL$$

where "c" is the speed of light, "n" is the effective index of the cavity mode, and "L" is the effective circumference of the cavity 201. In DWDM systems, it is generally beneficial for a tunable resonant optical wavelength filter 200 to have a bandwidth greater than the total optical bandwidth of the DWDM network, which is given by the product of the number of wavelength channels and the channel spacing between wavelength channels. By doing so, a single wavelength channel may be operated upon without interference from or by other channels. It is also generally beneficial for a tunable resonant optical wavelength filter 200 to have the resonance frequency passband, given by the expression $$\delta v = v/Q,$$

where "v" is the resonance frequency and "Q" is the quality factor of the cavity (i.e., which is related to the losses in the cavity), approximately equal to the frequency channel spacing. Therefore, a "high Q" cavity is one which has small losses.

According to the various embodiments of the present invention, the resonance frequencies of the respective cavities 201 may be changed by modifying the refractive index of the cavities 201, by the expression:

$$\frac{\Delta n}{n} = \frac{\Delta v}{v}$$

where "Δn" is the index change, "n" is the refractive index of the cavities 201, "Δv" is the change of the resonance frequency, and "v" is the resonance frequency without index change. Methods of changing the refractive index, including, but not limited to, the electro-optic effect, the thermo-optic effect, carrier injection, the Stark effect, the quantum-confined Stark effect, or the Franz-Keldysh effect, may be used. Alternatively, the cavities 201 may be manufactured from a piezoelectric material, in which the physical size of the cavities 201 may be changed.

The resonance bandwidths of the cavities 201 are adjusted either statically or dynamically by adjusting etch roughness, adjusting the gap spacing 206, placing the electrode structures 501 (described in greater detail in conjunction with FIG. 5) close enough to the cavities 201 to induce loss, or by placing a loss element on the top surface of the cavities 201 during fabrication, or by using a tunable loss element such as that provided by the electro-absorption effect, or by the use of planarization to control surface roughness.

The tunable resonant optical wavelength filters 201 of the present invention may be manufactured from numerous materials systems, using manufacturing methods adapted for those materials systems. Five such embodiments and associated manufacturing methods are described herein, four of which are suitable for single layer optical integrated circuits, and the final one being more general in that multi-layer, multi-purpose optical circuits may be implemented using it. However, it should be understood that the scope of the present invention includes the manufacture of a tunable resonant optical wavelength filter 200 and other resonant devices from other materials systems and using other methods of fabrication.

Figure 3:
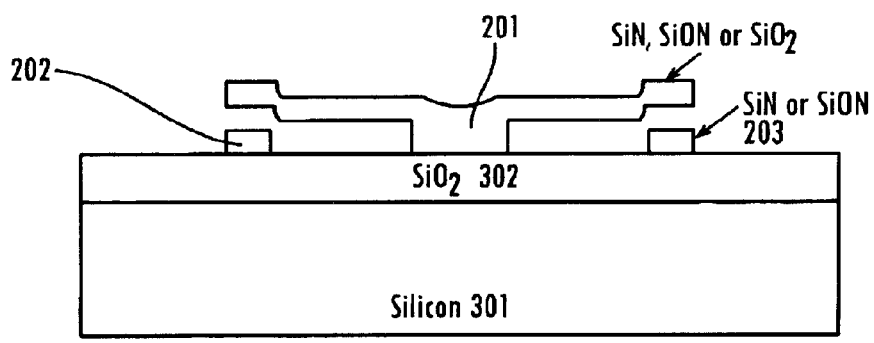
FIG. 3 is a front elevational view of a vertically-coupled resonant cavity device manufactured using silicon processing, in accordance with the preferred embodiment of the present invention.

A first method of manufacture, in accordance with the preferred embodiments, employs standard silicon processing techniques and uses a very common technique used in the fabrication of MEMS devices. According to this method, and as illustrated in FIG. 3, a silicon wafer 301 is oxidized to produce a low-index substrate layer 302. Alternatively, the $SiO_2$ layer may be deposited by a number of other methods, including but not limited to RF sputtering or chemical vapor deposition (CVD), or a glass substrate may be used instead. Then, a layer of SiN, SiON, or $Ta_2O_5$ is deposited thereon, preferably, by a CVD process or other process. Next, the SiN or SiON layer is patterned into the coupling waveguides 202, 203 using standard photolithography steps followed by a wet or dry etching process. Continuing, a layer of sacrificial polysilicon is deposited on the SiN or SiON layer. This layer may then be polished flat by a mechanical or chemical-mechanical polishing process to remove the bulge that occurs over the previously patterned waveguide 202, 203 structures. A hole is then patterned in the polysilicon, positioned where the center of the resonant cavity 201 will reside, again using standard photolithography and etching. The final deposition may be SiN, SiON, $Ta_2O$, or $SiO_2$, which forms the layer in which the cavity 201 of the tunable resonant optical wavelength filter is made. The cavity 201 is then patterned in this final layer, and the sacrificial polysilicon is removed, with the final result being depicted in FIG. 3, showing a suspended cavity 201. Alternatively, instead of using a suspended cavity 201, a permanent low refractive index layer may be placed between the waveguides 202, 203 and cavity 201 in place of polysilicon, substantially similar to the alternative embodiment shown in FIG. 2C. Electrodes may then be patterned on top of (i.e., for a suspended cavity) or beside (i.e., for a non-suspended cavity) the cavity 201 for tuning, using thermal or other similar techniques, in any number of geometries, of which some are presented subsequently.

Figures 4A, 4B:
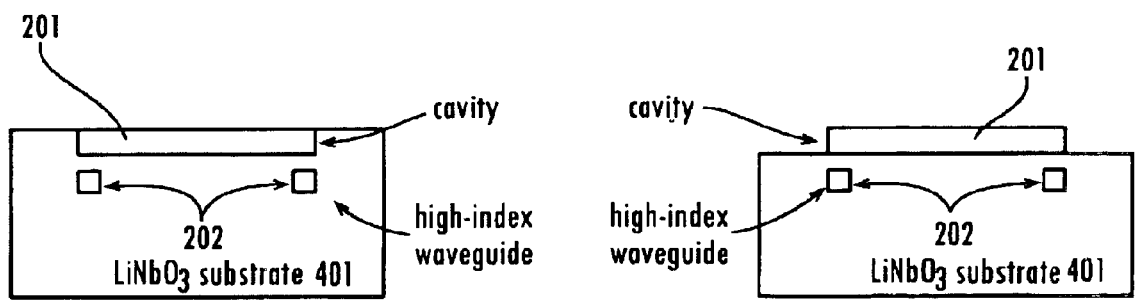
FIG. 4A is a front elevational view of a vertically-coupled resonant cavity device manufactured using $LiNbO_3$ technology, in accordance with an alternate embodiment of the present invention.
FIG. 4B is a front elevational view of a vertically-coupled resonant cavity device manufactured using $LiNbO_3$ technology, in accordance with an alternate embodiment of the present invention.

The vertical coupling structure (including, the optical waveguides 202, 203) of the tunable resonant optical wavelength filter shown in FIGS. 4A and 4B may be manufactured, in accordance with the preferred embodiments, from $LiNbO_3$ through a four step process using the diffusion of titanium, which increases the local refractive index. It should be noted that $LiNbO_3$ is a popular material for optical integrated circuits that exhibits the electro-optic effect. It should also be noted that many types of crystals other than $LiNbO_3$ also exhibit the electro-optic effect and that manufacture of the vertical coupling structure from them would, generally, follow the fabrication method described herein.

The first step in manufacturing the vertical coupling structure is to pattern the substrate 401 with a Ti metal layer representing the input and output strip waveguides, and to perform diffusion of Ti into the substrate at high temperatures to make surface guiding structures. In a second step, the Ti layer is removed and another high temperature cycle is performed so as to bury the waveguides 202 made in the first step underneath the surface at a desired depth. Finally, in the third step, the substrate is patterned with a Ti layer that represents the resonant cavity 201 and high temperature diffusion is performed in order to form the cavity guiding structure at the surface. In an alternative third step, and as shown in FIG. 4B, a surface planar waveguide 202, 203 is diffused and a resonant cavity 201 is etched using the same metal pattern as a mask.

Figure 5A:
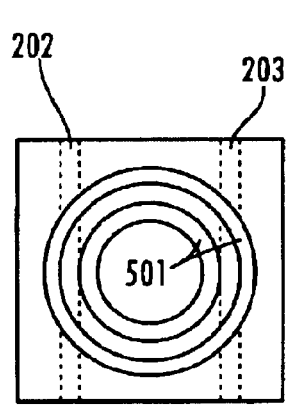
FIGS. 5A, 5B, and 5C are top plan views of vertically-coupled resonant cavity devices having different respective electrode configurations for resonance tuning, in accordance with alternate embodiments of the present invention.
Figure 5B:
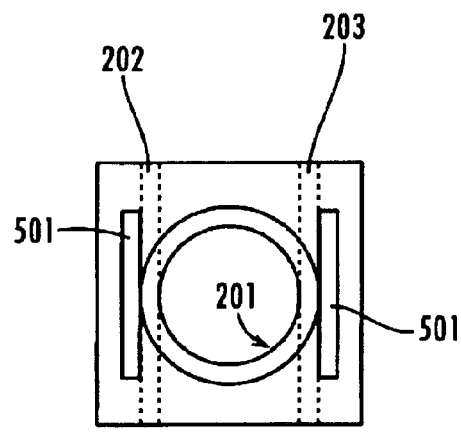
Figure 5C:
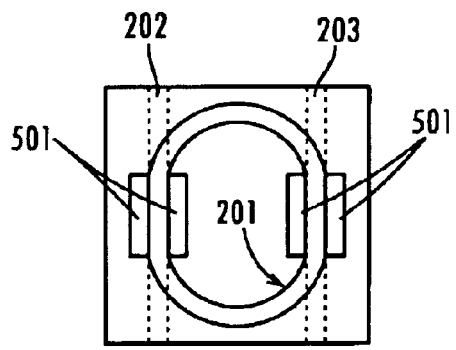

Although not required in the above-described diffusion method of manufacturing the vertical coupling structure, but required in order to perform cavity 201 tuning, a fourth step might include the patterning of electrodes 501 on the top of the substrate in order to utilize the electrooptic effect for cavity 201 tunability. FIGS. 5A, 5B, and 5C display three arrangements of tuning electrodes 501 fabricated by such patterning. FIG. 5A shows tuning electrodes 501 forming inner and outer annular rings. FIG. 5B shows tuning electrodes 501 tangent at two opposing points of the ring or disk 201. FIG. 5C shows tuning electrodes 501 on either side of the straight portion in a racetrack geometry 201. Note that the vertical separation between the waveguides 202, 203 and the cavity 201 allows flexibility in electrode 501 placement. In the side coupling embodiments of the prior art, the electrode 501 placement might interfere with the modes of the waveguides 202, 203, introducing a potential source of loss.

Figure 6:
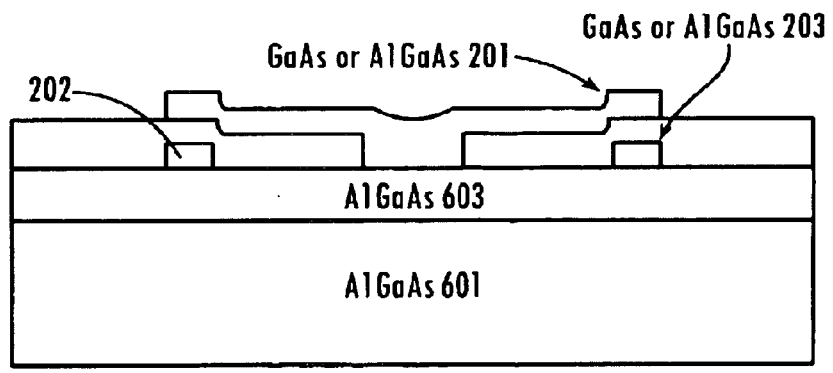
FIG. 6 is a front elevational view of a vertically-coupled resonant cavity device manufactured using GaAs technology, according to an alternate embodiment of the present invention.

Gallium arsenide, GaAs, is another popular material that exhibits the electro-optic effect and is becoming increasingly popular for high speed optical integrated lightwave circuits. Because of its relatively large bandgap, GaAs is transparent to wavelengths in the communications band. Implantation methods may be used with GaAs to produce vertical coupling structures similar to those described above with respect to $LiNbO_3$. Another method, acceptable in accordance with the preferred embodiments of the present invention, is to grow the structure as shown in FIG. 6. Since semiconductor crystals must be grown epitaxially, care must be taken to ensure that all substrate surfaces are lattice matched to the material being grown. This condition is satisfied by GaAs/AlGaAs, for example, with greater Al concentration producing lower refractive index films. The structure may be built upon an AlGaAs substrate 601 (or a GaAs wafer with an AlGaAs layer). First, a layer of GaAs (or AlGaAs with lower Al concentration than the substrate) is deposited and patterned to form the coupling waveguides 202, 203. Then, a layer of AlGaAs 603 with lower refractive index is deposited to serve as a buffer 205 layer between the waveguides 202, 203 and the cavity 201. A mechanical or chemical-mechanical polishing step may be used to planarize the surface in order to eliminate bending of the cavity 201 caused by layer growth on a non-uniform surface, as described later for multi-layer circuits. Finally, GaAs (or AlGaAs) is deposited to form the cavity 201 layer, which is then patterned. If desired, a final layer of low index AlGaAs is deposited to form a cladding layer. Electrode structures similar to those described with respect to $LiNbO_3$ may be formed to utilize the electro-optic effect for cavity 201 tuning. Another acceptable method for tuning is to dope the cavity 201 layer to form a p-n junction, through which carriers may be injected to change the refractive index.

Other materials systems, as noted above, may be used in the manufacture of the tunable resonant optical wavelength filter of the present invention. Such manufacture utilizes steps similar to those described above, but offers different mechanisms for tuning. For example, InGaAsP compounds have bandgaps in the wavelength regimes of interest for long distance telecommunications. With such compounds, losses may be minimized by operating with slightly larger bandgaps, and tuning may be accomplished using bandgap effects, such as the Franz-Keldysh effect or the Stark effect. Operating near resonance, these effects produce refractive index change with small absorption change. In addition, the cavity 201 may take the form of a multi-quantum well, in which case the quantum confined Stark effect may be used, which produces larger index changes. If operated close enough to the bandgap, then the electro-absorption produced by the Franz-Keldysh or Stark effects may be utilized either as an on-off modulator or as a control over the cavity quality factor, Q.

Figure 7:
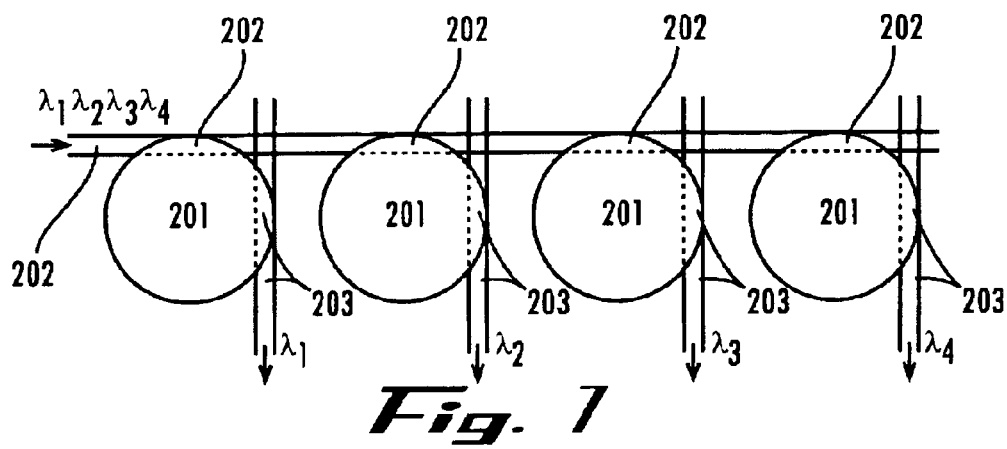
FIG. 7 is a block diagram representation of a tunable wavelength demultiplexer using vertically-coupled resonant cavities, according to an alternate embodiment of the present invention.

The tunable resonant optical wavelength filter of the present invention may be utilized in a number of optical wavelength circuits which are useful in DWDM optical fiber networks. A first such circuit includes a tunable optical demultiplexer shown in FIG. 7 (i.e., where only four wavelengths are depicted for purposes of simplicity). The tunable optical demultiplexer takes 'N' wavelengths from a single DWDM input and routes each wavelength to a unique output 203 (note that if operated in the reverse direction, the tunable optical demultiplexer performs as a tunable optical multiplexor). In the tunable optical demultiplexer, the cavity free-spectral range must be greater than the product of the number of wavelengths and the channel spacing, so that the filter passband filters out only one wavelength at a time. Typical channel spacings include 12.5 GHz, 25 GHz, 50 GHz, and 100 GHz, but other channel spacings may be acceptable or employed. The size of the cavity 201 may be determined in a straightforward manner based on the particular material system employed, using the formulas described above. In addition, the filter passband should be of the order of the channel spacing, which determines the cavity quality factor, Q. The quality factor may be adjusted during fabrication through choice of an appropriate etching technique for the cavity 201 (i.e., which affects the surface roughness and, therefore, the scattering loss) and through choice of an appropriate gap spacing 206. Methods for choosing the appropriate etching technique and an appropriate gap spacing 206 are known to those skilled in the art and will not be addressed herein. The use of tunable cavities 201 allows the wavelength routing pattern to be changed dynamically, such that one of many wavelengths may be directed to each output. It should be noted that in this circuit (and, in the following circuit), wavelength dropping need not occur with 100% efficiency, since high contrast is achieved at the output channels and any light exiting the input channel is discarded.

Figure 8:
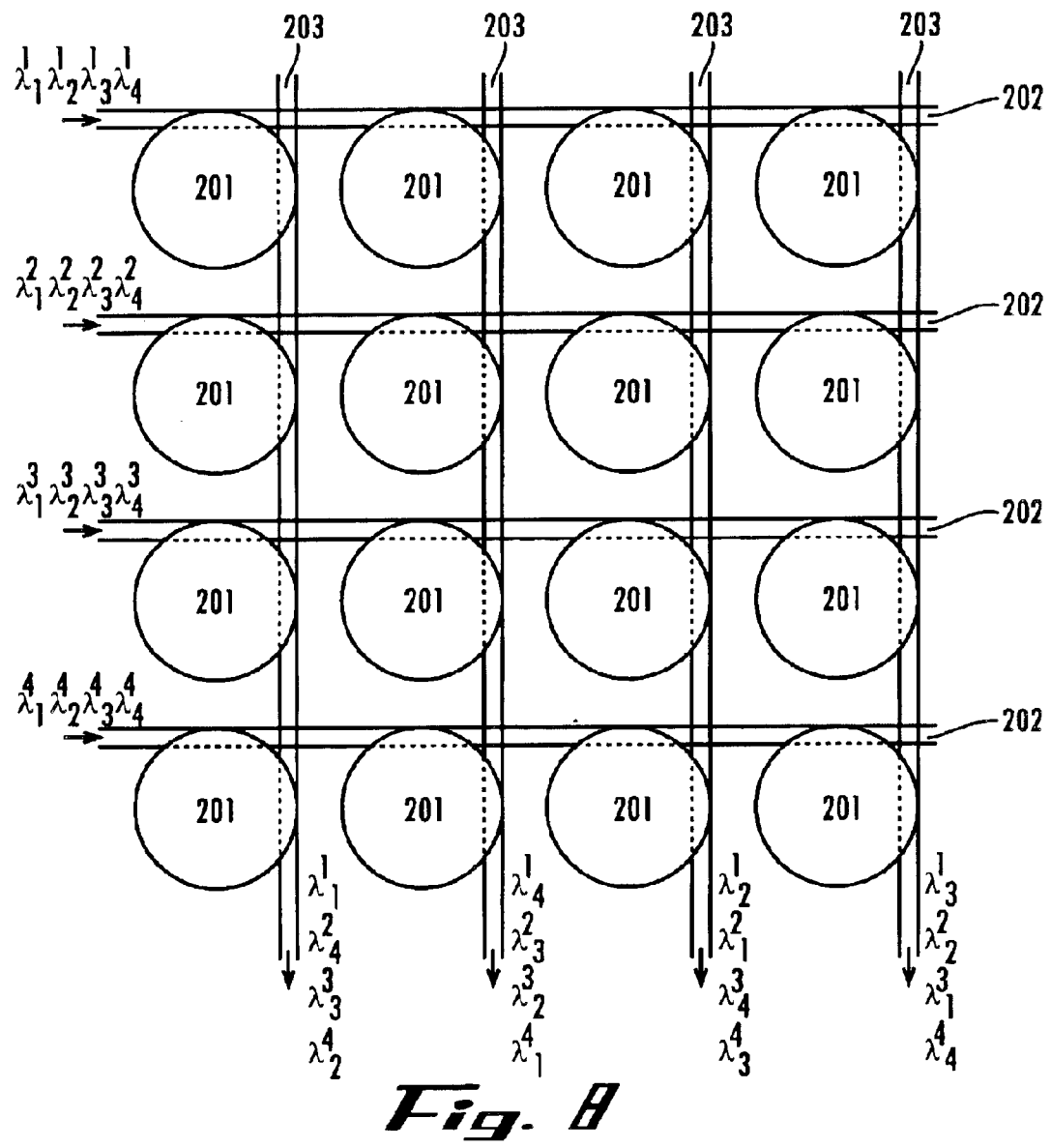
FIG. 8 is a block diagram representation of an N×N tunable wavelength routing switch using vertically-coupled resonant cavities, according to an alternate embodiment of the present invention.

FIG. 8 displays another circuit which employs the tunable resonant optical wavelength filter of the present invention. The circuit of FIG. 8 takes 'N' wavelengths from each of 'N' different DWDM inputs and routes them to 'N' outputs, such that each output receives all "N" wavelengths and each wavelength originates from a different input. In the circuit, as shown in FIG. 8, each input is received on a waveguide 202 and output on a waveguide 203. For simplicity, the circuit of FIG. 8 is shown for N=4, but circuits having greater values of 'N' are substantially similar. Circuits in which the number of input and output channels differ are also substantially similar. In such applications, not all wavelengths may be routed to output channels (and continue along the original transmission path), or not all outputs receive the full number of wavelengths. As described above, the tunable cavity 201 allows the routing to be dynamic, and to occur at very high speeds on the order of the microsecond and faster response times enabled by effects such as the electro-optic effect.

Figure 9:
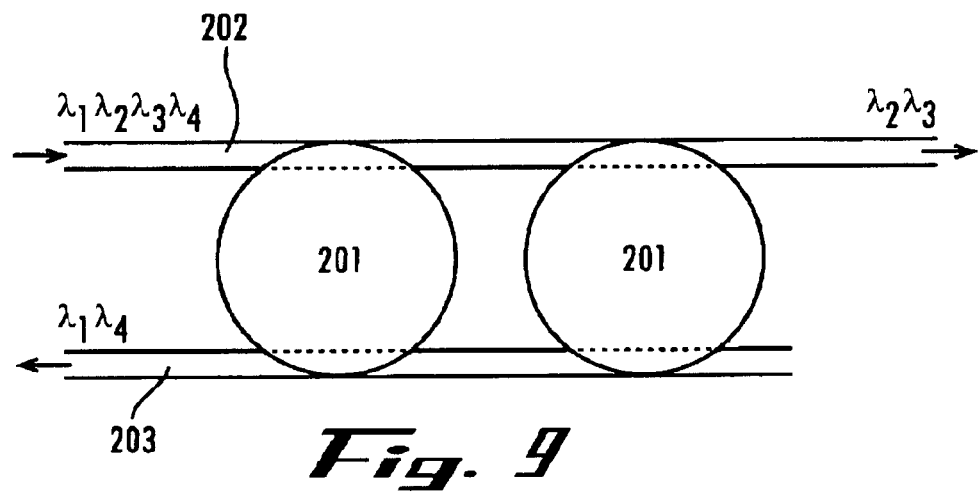
FIG. 9 is a block diagram representation of a tunable optical multi-wavelength drop circuit utilizing vertically-coupled resonant cavities, according to an alternate embodiment of the present invention.
Figure 10:
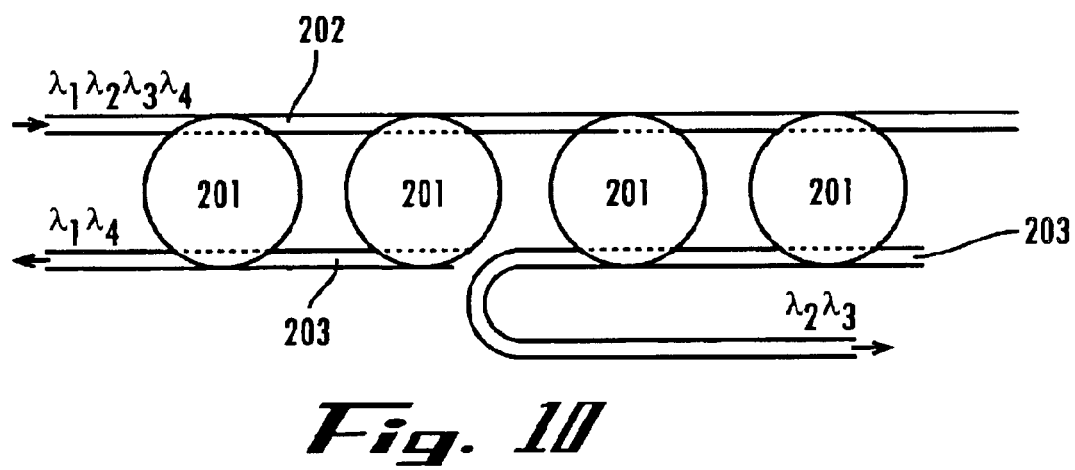
FIG. 10 is a block diagram representation of a tunable optical multi-wavelength drop circuit having one resonant cavity for each wavelength being communicated, according to an alternate embodiment of the present invention.

The tunable resonant optical wavelength filter of the present invention may also be employed in a tunable multi-wavelength drop circuit. Notably, such a circuit may be operated in the reverse direction, thereby performing a multi-wavelength add process. In a first form of the tunable multi-wavelength drop circuit shown in FIG. 9, one tunable cavity 201 per dropped wavelength is utilized. The wavelengths which are not dropped remain in the transmission channel. In some applications, wavelength excision may not be 100% efficient, thereby leading to poor contrast in the transmission channel due to remnants of the dropped wavelengths. A second form of the tunable multi-wavelength drop circuit displayed in FIG. 10 solves this problem by using one cavity 201 per number of wavelength channels. Similarly, the tunable multi-wavelength drop circuit of FIG. 9 may be modified by using additional cavities 201 to remove the transmitted wavelengths onto another transmission channel.

In accordance with a second preferred embodiment of the present invention, the tunable resonant optical wavelength filter comprises coupling waveguides that lie on top of, or overlap, a resonant cavity in a vertical arrangement. The tunable resonant optical wavelength filter of the second preferred embodiment is fabricated using the aforedescribed materials according to a hybrid fabrication method. In this second method, the resonant cavity 201 is fabricated first in an electro-optic material, as described above, and the coupling guides are fabricated last, from a different material. Using $LiNbO_3$ to provide electro-optic tunability, for example, the resonant cavity is defined in the $LiNbO_3$ substrate by patterned diffusion or by patterned etching of a diffused slab. Tunable resonant optical wavelength filters having resonant cavities 201 formed through patterned diffusion and patterned etching are displayed, respectively, in FIGS. 11 and 12.

Figure 11:
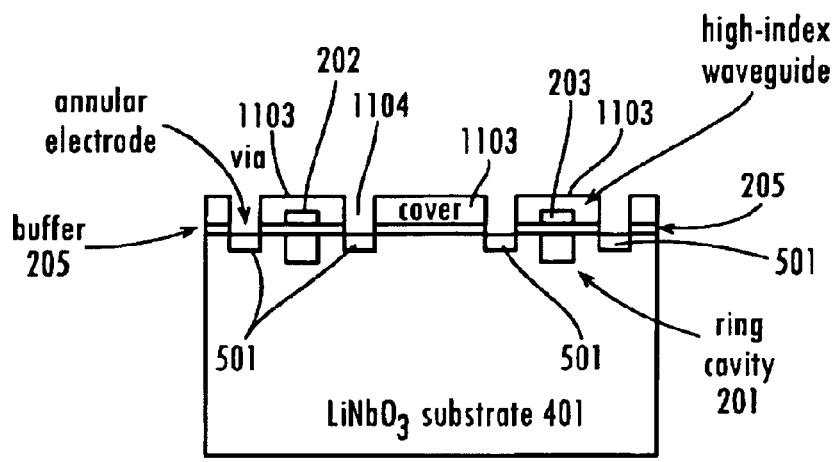
FIG. 11 is a front elevational view of a vertically-coupled resonant cavity device incorporating electrodes for resonance tuning, according to an alternate embodiment of the present invention.

In FIG. 11, a tunable resonant optical wavelength filter having a diffused ring resonant cavity 201 is shown. It should be understood, however, that the scope of the present invention includes any resonant cavity 201 geometry that supports traveling wave modes, or whispering gallery modes, including, but not limited to, square cavities, racetrack cavities, and disk cavities. Following this, electrode structures 501 may be fabricated. The substrate 401 may be etched in advance so that the electrodes 501 lie adjacent to the resonant cavity 201. As shown in FIG. 11, the electrodes 501 include the annular pattern of FIG. 5, but may be arranged in any of the three patterns displayed in FIG. 5 or in any other acceptable pattern. According to the hybrid manufacturing method, after diffusion and electrode 501 patterning, a low index buffer layer 205 is deposited to separate the resonant cavity 201 and waveguides 202, 203. The low index buffer layer 205 is fabricated from $SiO_2$ or SiON, for example, but must have a lower refractive index than either of the resonant cavity 201 or waveguides 202, 203. This layer may then be planarized to eliminate any bulge due to the electrodes 501, but it is not necessary for some electrode geometries (i.e., the parallel geometries) since the waveguides 202, 203 do not overlap the electrodes 501. Next, a high index layer of SiON, SiN, or $Ta_2O_5$, for example, is deposited and etched to form the coupling waveguides and other guiding and routing structures. A cover layer 1103 may then, optionally, be deposited to isolate the waveguiding layer 202, 203 from the environment. A final masking and etching step is then used to create deep vias 1104 so that metal may be deposited to contact the electrodes 501.

Figure 12:
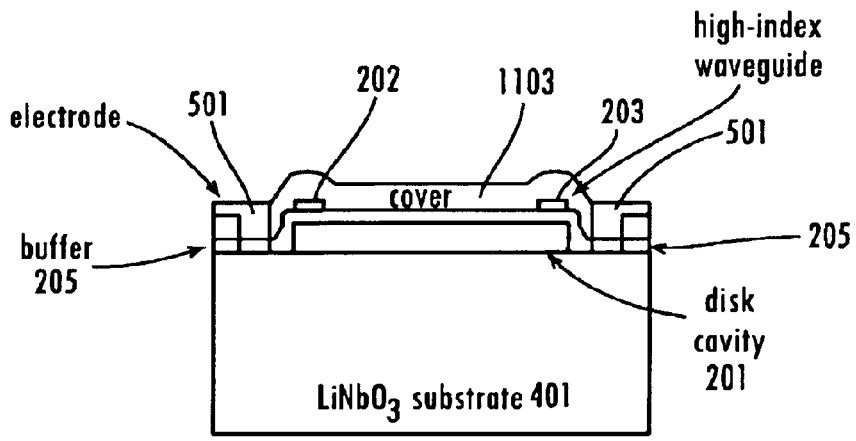
FIG. 12 is a front elevational view of a vertically-coupled resonant cavity device incorporating electrodes for resonance tuning and manufactured using $LiNbO_3$ technology, according to an alternate embodiment of the present invention.

FIG. 12 displays a tunable resonant optical wavelength filter having an etched disk cavity 201. According to a hybrid method of fabrication, after etching the uniform diffused layer, the electrodes 501 are patterned and the buffer layer 205 is deposited and planarized. Then, the waveguide layer 202, 203 is deposited. The waveguide layer 202, 203 is then patterned, and an optional cover 1103 layer deposited. Vias 1104 are again etched so that metal electrodes 501 may be contacted, as shown for the case where the electric field is applied across the cavity 201. In the electrode 501 arrangements of FIGS. 11 and 12, the electrode 501 placement may be used to control the loss in the resonant cavity 201, and therefore, the resonant cavity Q and resonance bandwidth. By moving the electrodes 501 closer to the resonant cavity 201, the evanescent portion of the resonant cavity mode in the plane will experience more loss due to the closer proximity of the metal of the electrodes.

Figure 13:
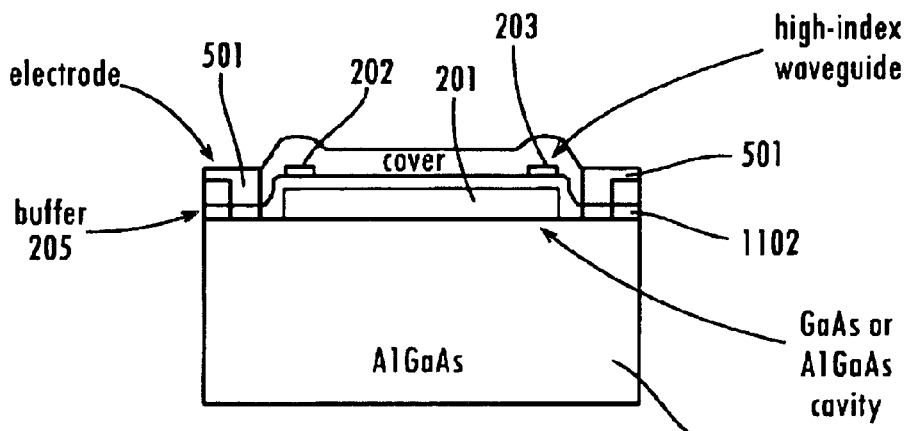
FIG. 13 is a front elevational view of a vertically-coupled resonant cavity device incorporating electrodes for resonance tuning and manufactured using AlGaAs technology, according to an alternate embodiment of the present invention.

A tunable resonant optical wavelength filter using GaAs material technology is illustrated in FIG. 13. As described above, a high index GaAs or AlGaAs layer is grown onto an AlGaAs substrate. According to a hybrid method of fabrication, the resonant cavity 201 is then etched into the high index layer, and electrode 501 structures patterned. A buffer layer 205 of lower index than the cavity, such as $SiO_2$, is then deposited and planarized, followed by the deposition of a higher index layer such as SiON, $Ta_2O_5$, or doped $SiO_2$ in which the waveguides 202, 203 are etched. After etching the waveguides 202, 203, an optional lower index cover layer 1103 is deposited. After etching vias 1104, metal deposition is used to contact the electrodes 501.

The second embodiment of the present invention has the advantages that the resonant cavity 201 may be made in a crystalline material that is electro-optic, while the waveguide 202, 203 structures may be made of a different material in which very low loss waveguides 202, 203 may be fabricated. In addition, the different materials (with different refractive indices) allow greater control over coupling into and out of the resonant cavity 201. Finally, placement of the waveguides 202, 203 on top of the resonant cavity 201 eliminates any bending of the resonant cavity 201, which may result in high resonant cavity 201 losses if planarization were not performed, as described for many embodiments.

Figure 14:
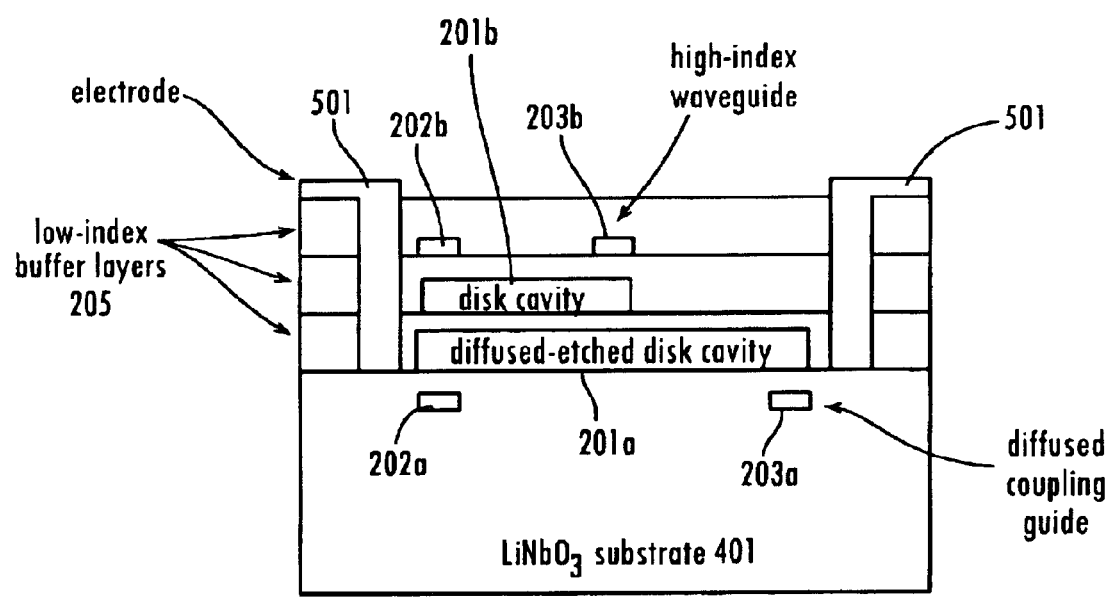
FIG. 14 is a front elevational view of a device having multiple vertically-coupled resonant cavities created on a single substrate, according to an alternative embodiment of the present invention.

Because of the complexity of operations that need to be performed by optical integrated circuits, it is desirable to utilize multiple layers of interconnect (i.e., optical waveguides 202, 203) and devices. The key to fabricating multi-level optical integrated circuits is planarization, a process which must be applied in advance of each new circuit layer. Planarization may be accomplished via mechanical or chemical-mechanical polishing techniques. This process is illustrated and described, in connection with FIG. 14 and the example below, using a single active layer in a $LiNbO_3$ substrate 401 that lies beneath additional, passive, circuit layers using amorphous materials. The same method may be straightforwardly applied to multi-level active circuits made via epitaxial growth such as $LiNbO_3$ and other electrooptic crystals and GaAs and other semiconductors.

In this example, the fabrication process proceeds initially in a manner similar to that described with respect to FIG. 4 using the etched cavity 201. The electrode 501 structure may then be deposited. A buffer, or isolation, layer 205 is then deposited, using PECVD or sputtering, of $SiO_2$ or SiON, for example. This layer 205 follows the contours of the surface, and, therefore, bulges at the positions of the cavity 201 and electrodes 501. Application of polishing removes the bulges and results in a flat surface on which to deposit the next layers. In this example, the next layer is another resonant cavity 201 that is vertically coupled to the main, tunable, cavity 201. This double cavity 201 arrangement may be used to increase the free-spectral range over a single cavity 201, in which frequencies coupled from the bottom-most waveguides 202, 203 to the top-most waveguides 202, 203 must satisfy the resonance condition for both cavities 201. Coupled cavities 201 may also be used to synthesize more general filtering functions. This passive cavity 201 may be made by deposition of a high index material such as SiON or $Ta_2O_5$, which is then patterned. Again, a lower index buffer layer is deposited and planarized. Coupling waveguides 202, 203 may then be deposited and etched on top of the passive cavity, and another buffer layer deposited and planarized. Finally, deep vias 1104 are etched and filled with metal to form contacts with the electrode structures 501. These electrode structures 501 will allow tunability of the active cavity 201, but will not interfere with the passive devices. Many other device geometries and circuits, consisting of active and passive components, may be devised by those skilled in the art.

Figure 15A:
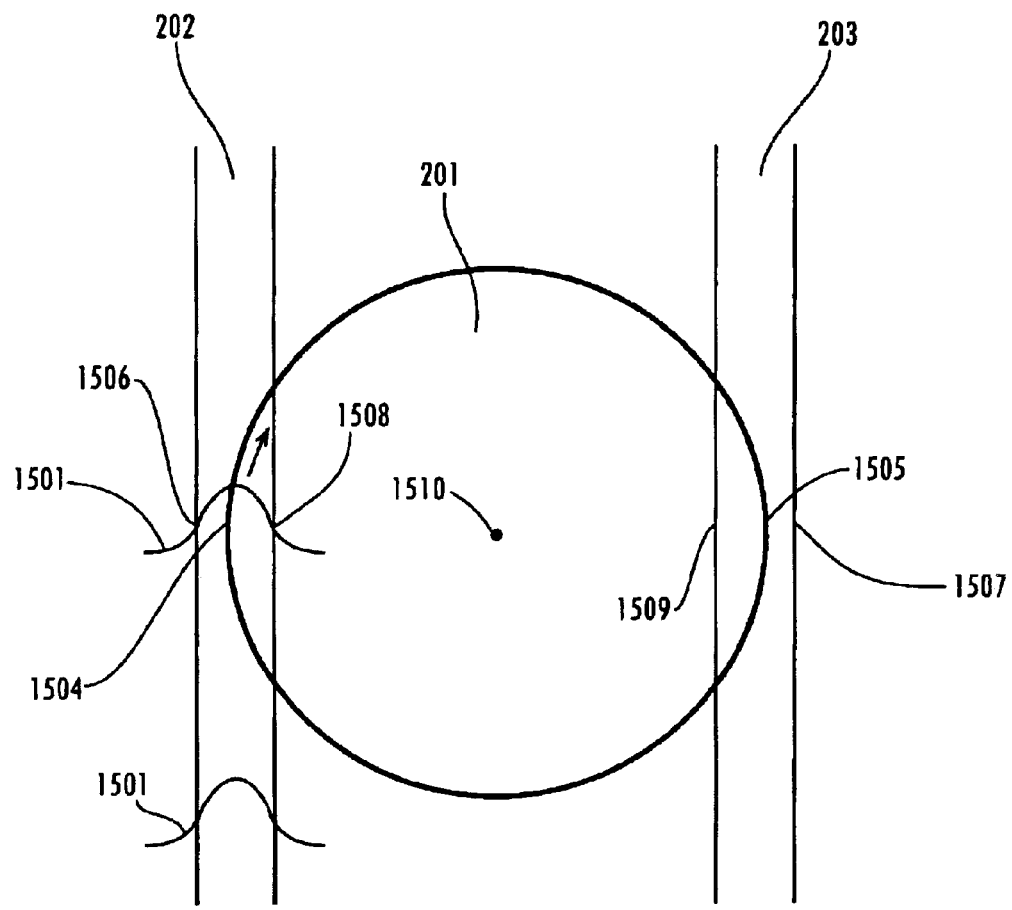
FIG. 15A is a top plan view of a resonant cavity device having a laterally-offset vertically-coupled resonant cavity, in accordance with an alternative embodiment of the present invention.
Figure 15B:
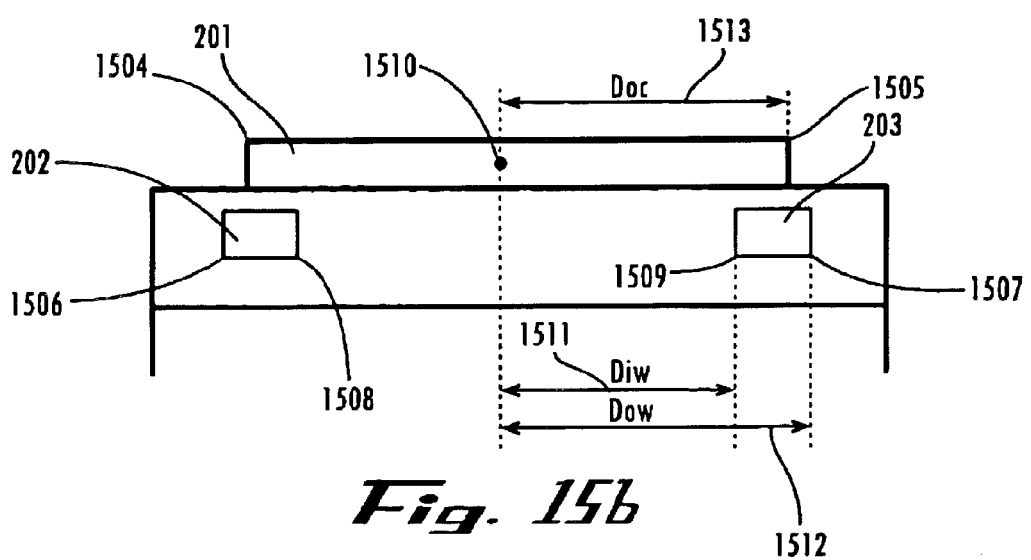
FIG. 15B is a front elevation view of the resonant cavity device of FIG. 15A.

FIG. 15A is a top plan view of a resonant cavity device having an underhanging laterally-offset vertically-coupled resonant cavity, in accordance with an alternative embodiment of the present invention. FIG. 15B is a front elevation view of the resonant cavity device of FIG. 15A. FIGS. 15B and 15A together show the arrangement of the underhanging laterally-offset vertically coupled resonant cavity. FIG. 15A shows a resonant cavity 201 vertically coupled to an input waveguide 202 and an output waveguide 203. In the alternative embodiment shown in FIG. 15A, the input and output waveguides 202, 203 are not lined up in flush alignment with the edge of the cavity 201. The input and output waveguides 202, 203 are aligned such that the cavity 201 underhangs the waveguides 202, 203. Underhanging refers to the arrangement shown in FIG. 15A and 15B where the waveguides 202, 203 are positioned such that the point 1508, 1509 on each waveguide 202, 203 closest to the center point 1510 of the cavity (the inner-most point) is inside the outer-most point 1504, 1505 of the cavity 201 and the point 1506, 1507 of each waveguide 202, 203 furthest from the center point of the cavity 1510 and collinear with the inner-most point of the waveguide 1508, 1509 and the center point of the cavity 1510 is further from the center point 1510 of the cavity than the outer-most point 1504, 1505 of the cavity 201 which is collinear with the center point of the cavity 1510 and the inner-most point of the waveguide 1508, 1509. The center point 1510 of the cavity 201 is the point geometrically at the center of the cavity 201.

The underhanging arrangement is further described with reference to the distances identified in FIG. 15B. Distance "$D_{oc}$" 1513 represents the distance between the center point 1510 of the cavity 201 and the outer-most point 1505 of the cavity 201. Distance "$D_{iw}$" 1511 represents the distance between the center point 1510 of the cavity 201 and the inner-most point 1508, 1509 of a waveguide 202, 203. Distance "$D_{ow}$" 1512 represents the distance between the center point 1510 of the cavity 201 and the outer-most point 1506, 1507 of a waveguide 202, 203. The underhanging arrangement may be described using the following relationships:

$$D_{oc} > D_{iw} \text{ and}$$

$$D_{oc} < D_{ow}.$$

In contrast to the underhanging arrangement, the flush arrangement of the preferred embodiment may be described using the following relationships:

$$D_{oc} > D_{iw} \text{ and}$$

$$D_{oc} = D_{ow}.$$

The underhanging arrangement provides certain advantages over the preferred embodiment for many applications. Generally, the lowest order radial mode 1501 on the cavity 201 is located at the edge of the cavity 201. Additionally, the peak of the wave 1502 on each waveguide 202, 203 is generally found in the center of the waveguide 202, 203. By aligning the center of the waveguide 202, 203 with the edge of the cavity 201, maximum coupling may be obtained. Additionally, for applications in which the level of coupling must be set to a certain value, the waveguides 202, 203 may be shifted toward or away from the center of the cavity 201 to achieve the desired amount of coupling. In the preferred embodiment, the amount of coupling may only be controlled by increasing or decreasing the vertical separation between the cavity 201 and the waveguides 202, 203. It is much more difficult to design a resonant cavity using varying separations than it is to design using shifted waveguides. Thus, the alternative embodiment show in FIGS. 15A and 15B allows greater control over coupling.

Figure 16A:
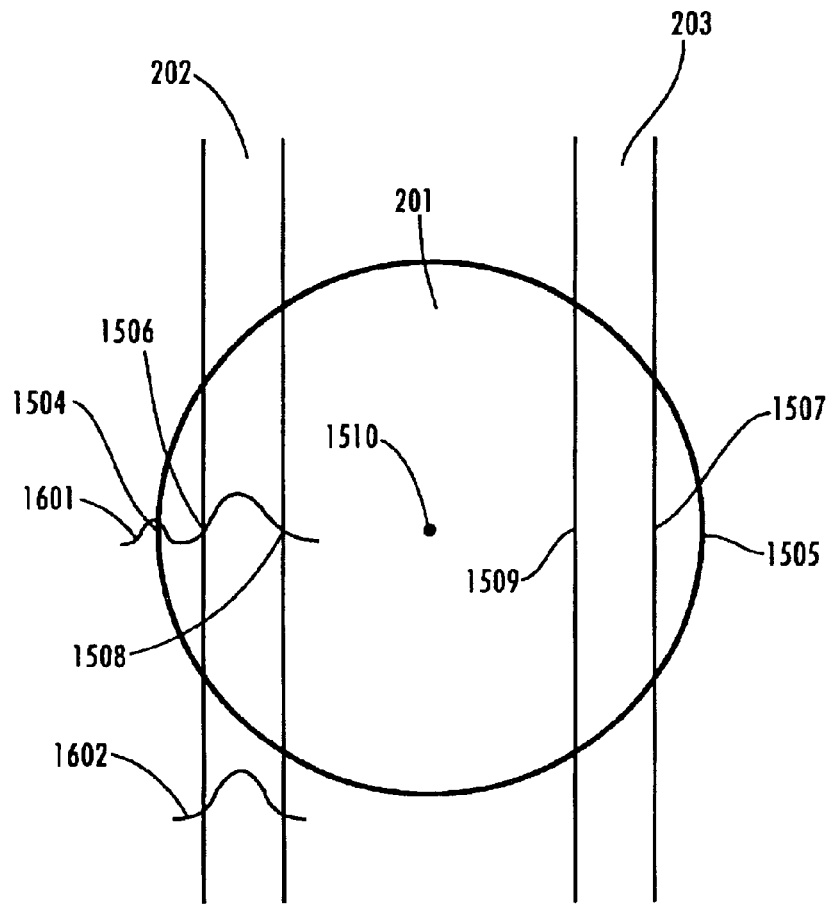
FIG. 16A is a top plan view of a resonant cavity device having a laterally-offset vertically-coupled resonant cavity, in accordance with an alternative embodiment of the present invention.

FIG. 16A is a top plan view of a resonant cavity device having an overhanging laterally-offset vertically-coupled resonant cavity, in accordance with an alternative embodiment of the present invention. FIG. 16A shows a resonant cavity 201 vertically coupled to an input waveguide 202 and an output waveguide 203. In the alternative embodiment shown in FIG. 16A, the input and output waveguides 202, 203 are not lined up in flush alignment with the edge of the cavity 201. The input and output waveguides 202, 203 are aligned such that the cavity 201 overhangs the waveguides 202, 203. Overhanging refers to the arrangement shown in FIGS. 16A and 16B where the waveguides 202, 203 are positioned such that the entire width of each waveguide 202, 203 is closer to the center point 1510 of the cavity than the outer-most point of the cavity 201 is to the center point of the cavity 1510.

Thus, in the overhanging arrangement, the waveguides 202, 203 are positioned such that the point 1508, 1509 on each waveguide 202, 203 closest to the center point 1510 of the cavity 201 (the inner-most point) is inside the outer-most point 1504, 1505 of the cavity 201 and the point 1506, 1507 of each waveguide 202, 203 furthest from the center point 1510 of the cavity 201 and collinear with the inner-most point 1508, 1509 of the waveguide 202, 203 and the center point 1510 of the cavity 201 is also closer to the center point 1510 of the cavity 201 than the outer-most point 1504, 1505 of the cavity 201 collinear with the center point 1510 of the cavity 201 and the inner-most point 1508, 1509 of the waveguide 202, 203. The center point 1510 of the cavity 201 is the point geometrically at the center of the cavity 201.

The overhanging arrangement is further described with reference to the distances identified in FIG. 16B. Distance "$D_{oc}$" 1513 represents the distance between the center point 1510 of the cavity 201 and the outer-most point 1505 of the cavity 201. Distance "$D_{iw}$" 1511 represents the distance between the center point 1510 of the cavity 201 and the inner-most point 1508, 1509 of waveguide 202, 203. Distance "$D_{ow}$" 1512 represents the distance between the center point 1510 of the cavity 201 and the outer-most point 1506, 1507 of a waveguide 202, 203. The overhanging arrangement may be described using the following relationships:

$$D_{oc} > D_{iw} \text{ and}$$

$$D_{oc} > D_{ow}.$$

Figure 16B:
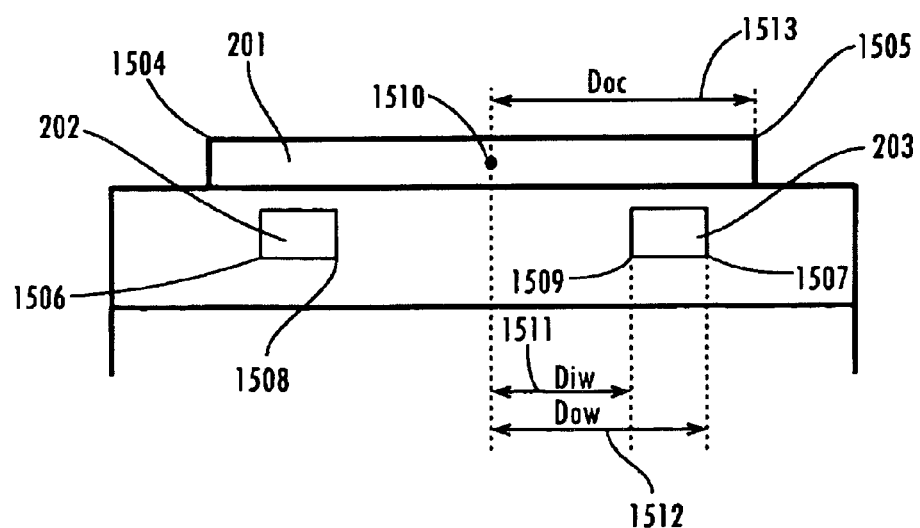
FIG. 16B is a front elevation view of a resonant cavity device of FIG. 16A.

FIG. 16B is a front elevation view of a resonant cavity device having an overhanging laterally-offset vertically-coupled resonant cavity, in accordance with an alternative embodiment of the present invention. FIGS. 16B and 16A together show the layout of the overhanging laterally-offset vertically coupled resonant cavity.

The overhanging arrangement provides certain advantages over the preferred embodiment for many applications. One primary benefit of the overhanging arrangement is the reduction of scattering losses by allowing the cavity 201 to operate in a higher order radial mode. When operating at a higher order radial mode, the peak of the wave 1601 occures inward from the edge of the cavity 201 toward the center of the cavity, as shown in FIG. 16A. Higher order radial modes are known to those skilled in the art of resonant cavity design. Because the peak of the wave 1602 on each waveguide 202, 203 is generally found in the center of the waveguide 202, 203, it is desirable to align the center of each waveguide 202, 203 with the peak of the wave 1601. Accordingly, when operating in the higher radial modes, the waveguides 202, 203 may be aligned in the overhanging configuration as shown in FIGS. 16A and 16B to increase the coupling efficiency. Additionally, as described in conjunction with FIGS. 15A and 15B, the waveguides 202, 203 may be shifted away from true alignment with the peak of the cavity wave 1601 to achieve the desired amount of coupling.

The distances $D_{iw}$ and $D_{ow}$ may be the same for both the input and the output waveguides. However, for purposes of adjusting the coupling efficiency, or other purposes, the distances $D_{iw}$ and $D_{ow}$ may be different. Typically, the cavity will either overhang or underhang both the input and output waveguides 202, 203, but this is not critical. For alternative designs, the input and output waveguides 202, 203 may use differing arrangements. For example, the cavity may overhang the input waveguide while it underhangs the output waveguide. Furthermore, the flush alignment may be used in combination with either the underhang or overhang arrangement. In all instances, the measurements $D_{iw}$, and $D_{ow}$ are used to show the distance between the center point of the cavity and the inner-most 1508, 1509 and outer-most points 1506, 1507 for the respective waveguides 202, 203.

Whereas this invention has been described in detail with particular reference to its preferred embodiments and variations thereof, it is understood that other variations and modifications can be effected within the spirit and scope of the invention, as described herein before and as defined in the appended claims. The corresponding structures, materials, acts, and equivalents of all means plus function elements, if any, in the claims below are intended to include any structure, material, or acts for performing the functions in combination with other claimed elements as specifically claimed.

What is claimed is:

1. An optical wavelength filtering apparatus, comprising:
an input waveguide in a first plane;
an output waveguide in a second plane; and,
a resonant cavity in a third plane distinct from said first plane and said second plane and substantially parallel to said first plane and said second plane; wherein said resonant cavity has a center point, a first outer-most point and a second outer-most point defining the width of said resonant cavity; wherein the center point, the first outer-most point and the second outer-most point are collinear;
wherein said input waveguide is offset from the first outer-most point of said resonant cavity and said output waveguide is offset from the second outer-most point of said resonant cavity;
wherein the offset is described by the relationships:

$$D_{oc} > D_{iw}; \text{ and}$$

$$D_{ic} > D_{ow};$$

wherein $D_{oc}$ is the distance between the center point of the cavity and the outer-most point of said resonant cavity, $D_{iw}$ is the distance between the center point of said resonant cavity and the inner-most point of the input waveguide, and $D_{ow}$ is the distance between the center point of the cavity and the outer-most point of said input waveguide;
wherein the inner-most point of said input waveguide is the point on said input waveguide closest to the center point of said resonant cavity and the outer-most point of said input waveguide is the point on said input waveguide furthest from the center point of said resonant cavity and collinear with the center point of said resonant cavity and the inner-most point of said input waveguide.

2. An optical wavelength filtering apparatus, comprising:
an input waveguide in a first plane;
an output waveguide in a second plane; and,
a resonant cavity in a third plane distinct from said first plane and said second plane and substantially parallel to said first plane and said second plane; wherein said resonant cavity has a center point, a first outer-most point and a second outer-most point defining the width of said resonant cavity: wherein the center point, the first outer-most Point and the second outer-most point are collinear;
wherein said input waveguide is offset from the first outer-most point of said resonant cavity and said output waveguide is offset from the second outer-most point of said resonant cavity;
wherein the offset is described by the relationships:

$$D_{oc} > D_{iw}; \text{ and}$$

$$D_{oc} > D_{ow};$$

wherein $D_{oc}$ is the distance between the center point of said resonant cavity and the outer-most point of said resonant cavity, $D_{iw}$ is the distance between the center point of said resonant cavity and the inner-most point of said output waveguide, and $D_{ow}$ is the distance between the center point of said resonant cavity and the outer-most point of said output waveguide;
wherein the inner-most point of said output waveguide is the point on said output waveguide closest to the center point of said resonant cavity and the outer-most point of said output waveguide is the point on said output waveguide furthest from the center point of said resonant cavity and collinear with the center point of said resonant cavity and the inner-most point of said output waveguide.

3. An optical wavelength filtering apparatus, comprising:

an input waveguide in a first plane;

an output waveguide in a second plane; and, a resonant cavity in a third plane distinct from said first plane and said second plane and substantially parallel to said first plane and said second plane; wherein said resonant cavity has a center point, a first outer-most point and a second outer-most point defining the width of said resonant cavity; wherein the center point, the first outer-most Point and the second outer-most point are collinear;

wherein said input waveguide is offset from the first outer-most point of said resonant cavity and said output waveguide is offset from the second outer-most point of said resonant cavity;

wherein said resonant cavity has an adjustable resonance width.

4. An optical wavelength filtering apparatus, comprising:

an input waveguide in a first plane;

an output waveguide in a second plane;

a resonant cavity in a third plane distinct from said first plane and said second plane and substantially parallel to said first plane and said second plane; wherein said resonant cavity has a center point, a first outer-most point and a second outer-most point defining the width of said resonant cavity; wherein the center point, the first outer-most point and the second outer-most point are collinear; and, an absorbing layer positioned in close proximity to said resonant cavity;

wherein said absorbing layer allows adjustment of the resonance width;

wherein said input waveguide is offset from the first outer-most point of said resonant cavity and said output waveguide is offset from the second outer-most point of said resonant cavity.

5. A method of making an optical wavelength filtering apparatus, comprising the steps of:

providing an input waveguide in a first plane;

providing an output waveguide in a second plane;

providing a resonant cavity in a third plane, wherein the third plane is vertically separated from the first and second planes; and, applying an electrical current to the resonant cavity to tune the resonant cavity;

wherein the electrical current is applied to electrode structures that are substantially tangent to the resonant cavity at two opposing points on the perimeter of the resonant cavity.

6. A method of making an optical wavelength filtering apparatus, comprising the steps of:

providing an input waveguide in a first plane;

providing an output waveguide in a second plane;

providing a resonant cavity in a third plane, wherein the third plane is vertically separated from the first and second planes; and, etching vias to provide a connection path to buried electrodes.

7. A method of manufacturing an optical wavelength filtering apparatus, comprising the steps of:

depositing a first substrate layer in a first plane, the first substrate layer having a first thickness;

depositing a second substrate layer in a second plane substantially parallel to the first plane, the second substrate layer having a second thickness;

patterning the second substrate layer into a first optical pattern comprising a first waveguide and a second waveguide;

depositing a third substrate layer in a third plane substantially parallel to the second plane, the third substrate layer having a third thickness;

depositing a fourth substrate layer in a fourth plane substantially parallel to the third plane, the fourth substrate layer having a fourth thickness; and, patterning the fourth substrate layer into a second optical pattern.

8. A method of manufacturing an optical wavelength filtering apparatus, comprising the steps of:

depositing a first substrate layer in a first plane, the first substrate layer having a first thickness;

depositing a second substrate layer in a second plane substantially parallel to the first plane, the second substrate layer having a second thickness;

patterning the second substrate layer into a first optical pattern;

depositing a third substrate layer in a third plane substantially parallel to the second plane, the third substrate layer having a third thickness;

depositing a fourth substrate layer in a fourth plane substantially parallel to the third plane, the fourth substrate layer having a fourth thickness; and, patterning the fourth substrate layer into a second optical pattern comprising a resonant cavity.

9. The method of claim 8, further comprising the step of:

polishing the fourth substrate layer to a desired surface texture to achieve a desired cavity resonance width.

10. The method of claim 9, further comprising the steps of:

polishing the third substrate layer to planarize the third substrate layer;

patterning a hole in the third substrate layer positioned where the center of a resonant cavity will be provided.

11. The method of claim 10, further comprising the step of:

removing the third substrate layer after the resonant cavity has been patterned.

12. The method of claim 9, further comprising the step of:

determining the depth of the third substrate layer by calculating the desired vertical spacing between the second substrate layer and the fourth substrate layer.

13. The method of claim 12, wherein the step of determining the depth of the third substrate layer is performed by calculating the desired vertical separation between a resonant cavity and a waveguide.

14. A method of manufacturing an optical wavelength filtering apparatus, comprising the steps of:

depositing a first substrate layer in a first plane, the first substrate layer having a first thickness;

depositing a second substrate layer in a second plane substantially parallel to the first plane, the second substrate layer having a second thickness;

patterning the second substrate layer into a first optical pattern;

depositing a third substrate layer in a third plane substantially parallel to the second plane, the third substrate layer having a third thickness;

depositing a fourth substrate layer in a fourth plane substantially parallel to the third plane, the fourth substrate layer having a fourth thickness;

patterning the fourth substrate layer into a second optical pattern; and, etching vias to provide contact points for electrode structures.

15. A method of manufacturing an optical wavelength filtering apparatus, comprising the steps of:

depositing a first substrate layer in a first plane, the first substrate layer having a first thickness;

depositing a second substrate layer in a second plane substantially parallel to the first plane, the second substrate layer having a second thickness;

patterning the second substrate layer into a first optical pattern;

depositing a third substrate layer in a third plane substantially parallel to the second plane, the third substrate layer having a third thickness;

depositing a fourth substrate layer in a fourth plane substantially parallel to the third plane, the fourth substrate layer having a fourth thickness;

patterning the fourth substrate layer into a second optical pattern; and, providing an absorbing layer close to the third substrate layer.

16. A method of manufacturing an optical wavelength filtering apparatus, comprising the steps of:

depositing a first substrate layer in a first plane, the first substrate layer having a first thickness;

depositing a second substrate layer in a second plane substantially parallel to the first plane, the second substrate layer having a second thickness;

patterning the second substrate layer into a first optical pattern;

depositing a third substrate layer in a third plane substantially parallel to the second plane, the third substrate layer having a third thickness;

depositing a fourth substrate layer in a fourth plane substantially parallel to the third plane, the fourth substrate layer having a fourth thickness;

patterning the fourth substrate layer into a second optical pattern; and, using multi-level diffusion comprising Ti diffusion in $LiNbO_3$ to obtain vertical separation between the second substrate layer and the third substrate layer.

* * * * *